US011797385B2

(12) United States Patent
Reina (10) Patent No.: US 11,797,385 B2
(45) Date of Patent: Oct. 24, 2023

(54) MANAGING INFORMATION PROTECTION SCHEMES IN MEMORY SYSTEMS

(71) Applicant: Micron Technology, Inc., Boise, ID (US)

(72) Inventor: Vincenzo Reina, Munich (DE)

(73) Assignee: Micron Technology, Inc., Boise, ID (US)

(*) Notice: Subject to any disclaimer, the term of this patent is extended or adjusted under 35 U.S.C. 154(b) by 10 days.

(21) Appl. No.: 17/510,135

(22) Filed: Oct. 25, 2021

(65) Prior Publication Data
US 2023/0132223 A1    Apr. 27, 2023

(51) Int. Cl.
*G06F 11/10*    (2006.01)
*G06F 11/07*    (2006.01)

(52) U.S. Cl.
CPC .......... *G06F 11/108* (2013.01); *G06F 11/076* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 8,443,242 B2* | 5/2013 | Weingarten | G06F 11/1068 714/704 |
| 8,898,548 B1* | 11/2014 | Mullendore | G06F 11/1048 714/751 |
| 10,929,224 B2* | 2/2021 | Klein | G06F 3/0616 |
| 2015/0378801 A1* | 12/2015 | Navon | G06F 11/076 714/704 |
| 2019/0385694 A1* | 12/2019 | Chen | G11C 29/44 |

* cited by examiner

*Primary Examiner* — Cynthia Britt
*Assistant Examiner* — Matthew W Wahlin
(74) *Attorney, Agent, or Firm* — Holland & Hart LLP (57) ABSTRACT

Methods, systems, and devices for managing information protection schemes in memory systems are described. A memory device may dynamically select an information protection scheme from a set of information protection schemes. In some examples, the memory device may identify a quantity of defective blocks in each plane associated with a control. The memory device may then identify a quantity of planes that satisfy a block threshold. In some cases, the memory device may select an information protection scheme using the quantity of planes. The information protection scheme may be an example of a redundant array of independent nodes scheme, and may indicate a quantity of planes used in performing a protected write operation.

25 Claims, 5 Drawing Sheets

MANAGING INFORMATION PROTECTION SCHEMES IN MEMORY SYSTEMS

FIELD OF TECHNOLOGY

The following relates generally to one or more systems for memory and more specifically to managing information protection schemes in memory systems.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory devices may use information protection schemes as part of programming data, such as a redundant array of independent nodes (RAIN), to protect data from corruption or unexpected loss. For example, a memory device programming data using an information protection scheme may generate one or more error control codes (e.g., error correction codes (ECC) or parity information). The one or more error control codes may be configured to be used with an error control procedure to detect or correct errors in the data. The data, along with the one or more error control codes, may be programmed to a block or page in each plane of a quantity of planes across each memory die of a control channel of the memory device. In some information protection schemes, the quantity of planes may be equal to the total quantity of planes associated with the control channel, while other information protection schemes may use a quantity of planes that may be less than the total quantity of planes associated with the control channel. An information protection scheme that uses a greater quantity of planes may be faster, by allowing for faster sequential write performance. A plane may be used in an information protection scheme if the plane has a quantity of available blocks that is above a threshold associated with the that information protection scheme (e.g., at least one block that has not already been used or is not a defective block). As a memory device "fills up" (e.g., as more data is programmed to the memory device such that each plane of the device has fewer available blocks), some planes with a relatively large quantity of defective blocks or occupied blocks may have no available blocks, while other planes with relatively fewer defective blocks or occupied blocks may still have available blocks. However, if the information protection scheme uses a quantity of planes greater than the quantity of planes with an available block, the memory device may not be able to use the information protection scheme. Techniques to dynamically adjust the information protection scheme are desired.

As described herein, a memory device may dynamically select an information protection scheme to use based on a quantity of planes satisfying a defective block threshold. By way of example, the memory device may determine the quantity of defective blocks, available blocks, or both in each plane of the memory device. That is, the memory device may determine whether each plane satisfies the defective block threshold. The memory device may then select an information protection scheme that may be used with the quantity of planes that satisfy the defective block threshold. For example, if the memory device supports two information protection schemes, and the quantity of planes that satisfy the defective block threshold satisfies a first threshold associated with a first information protection scheme, but fails to satisfy a second threshold associated with the second information protection scheme, the memory device may select the first information protection scheme. Alternatively, if the quantity of planes that satisfy the defective block threshold satisfies the first threshold and the second threshold, the memory device may select the second information protection scheme. The described techniques to dynamically select an information protection scheme may increase the yield of storage space of a memory device, for example by allowing the memory device to utilize more available blocks in planes with relatively fewer defective blocks.

Figure 1:
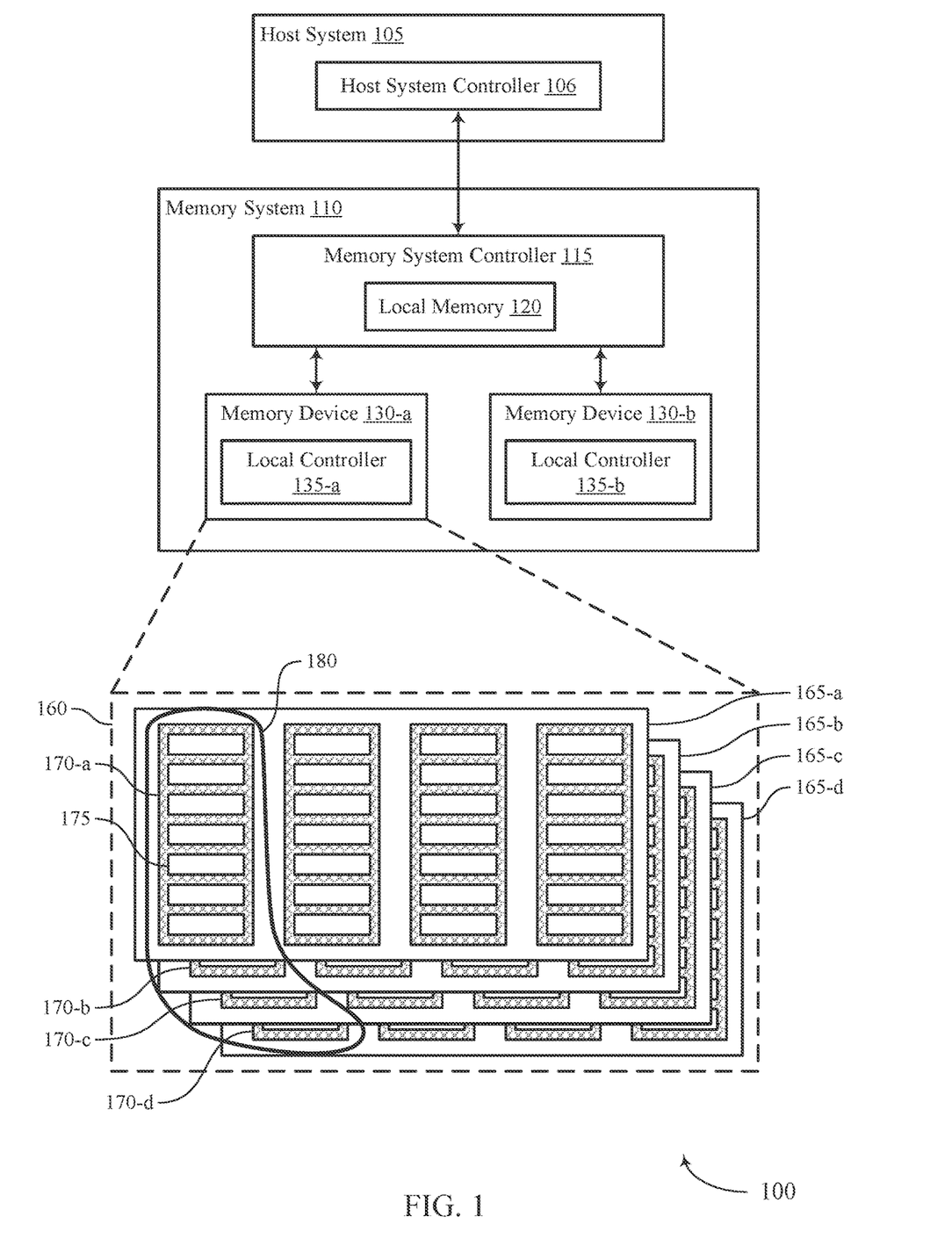
FIG. 1 illustrates an example of a system that supports managing information protection schemes in memory systems in accordance with examples as disclosed herein.

Features of the disclosure are initially described in the context of systems, devices, and circuits with reference to FIG. 1. Features of the disclosure are described in the context of a set of blocks and a process flow with reference to FIGS. 2-3. These and other features of the disclosure are further illustrated by and described in the context of an apparatus diagram and flowchart that relate to managing information protection schemes in memory systems with reference to FIGS. 4-5.

FIG. 1 illustrates an example of a system 100 that supports managing information protection schemes in memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (OMANI), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support managing information protection schemes in memory systems. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, a memory device 110 may dynamically select an information protection scheme based on a quantity of planes 165 satisfying a defective block threshold. By way of example, the memory device may determine the quantity of defective blocks, available blocks, or both in each plane 165 of the memory device 110. That is, the memory device 110 may determine whether each plane 165 satisfies the defective block threshold. The memory device may then select an information protection scheme which may be used with the quantity of planes 165 that satisfy the defective block threshold. For example, if the memory device supports two information protection schemes, and the quantity of planes 165 that satisfy the defective block threshold satisfies a first threshold associated with a first information protection scheme, but fails to satisfy a second threshold associated with the second information protection scheme, the memory device 110 may select the first information protection scheme. Alternatively, if the quantity of planes 165 that satisfy the defective block threshold satisfies the first threshold and the second threshold, the memory device may select the second information protection scheme.

Figure 2:
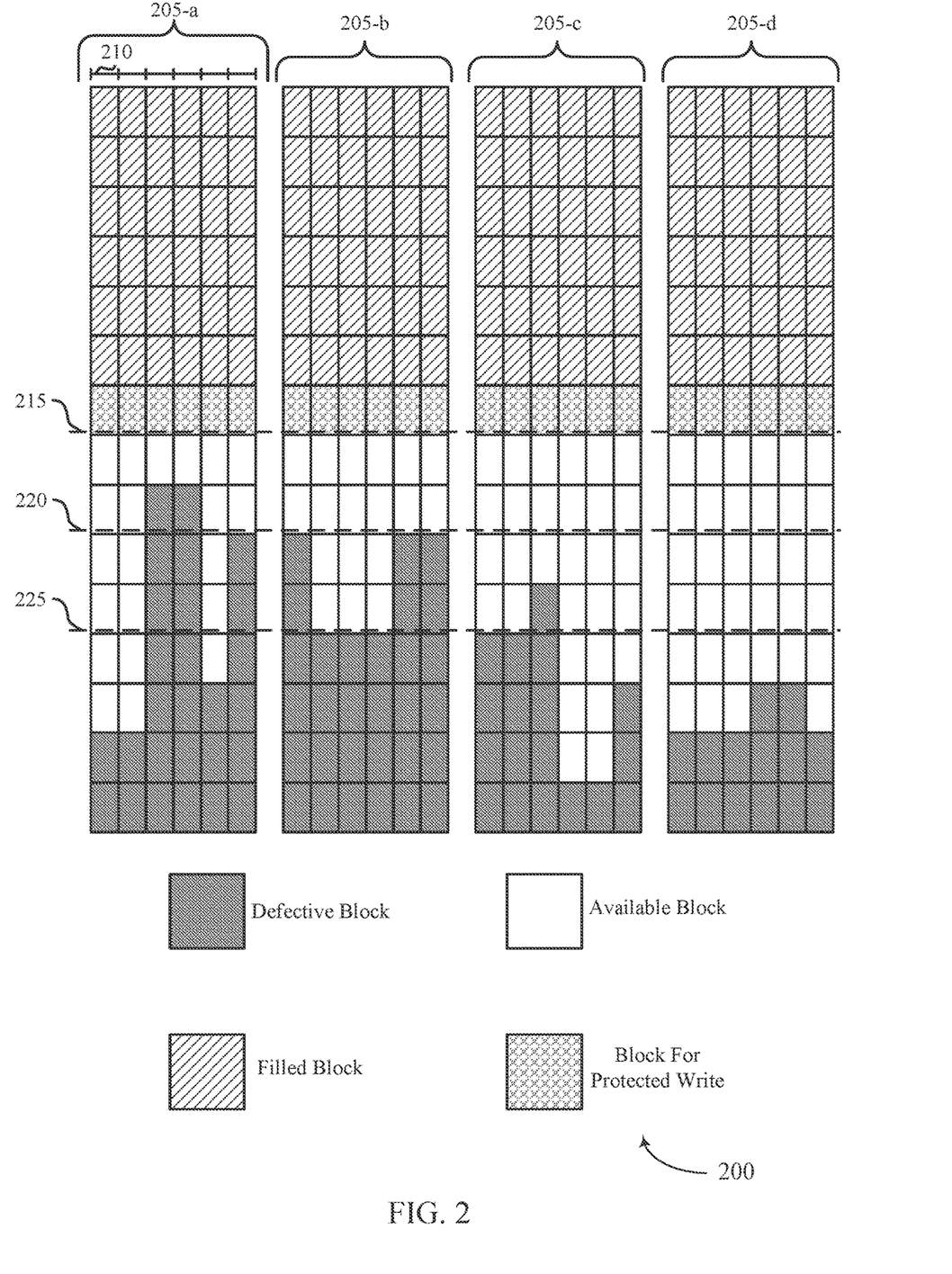
FIG. 2 illustrates an example of a set of blocks that supports managing information protection schemes in memory systems in accordance with examples as disclosed herein.

FIG. 2 illustrates an example of a set of blocks 200 that supports managing information protection schemes in memory systems in accordance with examples as disclosed herein. The set of blocks 200 may be associated with a control channel of a memory device, and may be arranged in one or more memory dies 205. In a non-limiting example, the set of blocks may be arranged in four memory dies (e.g., a memory die 205-a, a memory die 205-b, a memory die 205-c, and a memory die 205-d), although it may be appreciated that other quantities of memory dies are possible. Each memory die 205 may be include a quantity of planes 210. For example, each memory die 205 may include six planes, although it may be appreciated that other quantities of planes are possible. A memory device may include one or more dies. Each die may include one or more planes, each of which may have an independent data register group that can perform concurrent operations on multiple planes under some conditions. A plane may include one or more blocks, each of which is a basic unit that is capable of being erased. A block may include one or more pages, each of which is a basic unit capable of being read or written to as part of an access operation.

Each plane 210 may include or may be a quantity of blocks of memory cells, each of which may include or may be a set of pages of memory cells for storing data from a host system. As part of performing a write operation, the memory device may use an information protection scheme, such as a RAIN scheme, to protect data from corruption or unexpected loss. For example, to perform a write operation with an information protection scheme, the memory device may generate one or more error control codes (e.g., ECC or parity information). The one or more error control codes may be configured to be used with an error control procedure to detect or correct errors in the data.

The data, along with the one or more error control codes, may be stored in an available block (e.g., to a page of an available block) in each plane 210 of each of a quantity of planes across each memory die of a control channel of the memory device. The quantity of planes may be determined by (e.g., may correspond to) a selected information protection scheme. For example, a first information protection scheme may use a quantity of planes equal to the total quantity of planes associated with the control channel (e.g., 24 planes), while a second information protection scheme may use a quantity of planes less than the total quantity of planes associated with the control channel (e.g., 18 planes).

A block may be available if the block has not already been programmed or partially programmed with valid host data (e.g., if the block is not a filled block) or if the block is not a defective block. A defective block may be an example of a block that includes defects or faults that do not allow or mitigate the ability of the block to store data. The defective blocks in each plane may be identified during a testing phase of operation or during other background operations. In some cases, an indication of the quantity of detective blocks in each plane may be stored in the memory device, for example at a register, which may be referred to as a bad block count or a defective block count.

A plane 210 may be used in an information protection scheme if the plane satisfies one or more of a plurality of block thresholds, such as an available block threshold, an unavailable block threshold, or a defective block threshold. For example, blocks of the plane 210 may satisfy a block threshold in a variety of conditions. In some cases, if the plane 210 has a quantity of available blocks that satisfies an available block threshold associated with the information protection scheme, the memory system may use that information protection scheme. In some cases, if the plane 210 has a quantity of unavailable blocks (e.g., defective blocks and occupied blocks) that variety an unavailable block threshold associated with the information protection scheme, the memory system may use that information protection scheme. In some cases, if the plane 210 has a quantity of defective blocks that variety a defective block threshold associated with the information protection scheme, the memory system may use that information protection scheme. Because the quantity of available blocks in each plane 210 changes (e.g., decreases) as the memory device programs more data, the block threshold may accordingly change. For example, the block threshold may be a first threshold 215, and thus a first quantity of planes may satisfy the first threshold 215. However, as the memory device programs more data, the quantity of available blocks in each plane 210 may be reduced (e.g., due to an increase of filled blocks), and the block threshold may be adjusted to a second threshold 220. Thus, a second quantity of planes (e.g., a second quantity less than the first quantity) may satisfy the block threshold. If a selected information protection scheme is configured to use more planes than the quantity of planes that satisfy the block threshold, then the memory device may not be able to perform a write operation using selected information protection scheme (e.g., a protected write operation). In some examples, unavailable block thresholds may be used (such as a threshold that includes defective block and occupied blocks) instead of available block threshold using the techniques described here. In some examples, defective block thresholds may be used instead of available block threshold using the techniques described here. Functionality described in this disclosure with reference to one of the different types of block thresholds may be applied to other types of block thresholds without loss of meaning.

Accordingly, the memory device may select an information protection scheme from a set of multiple information protection schemes be determining whether the quantity of planes which satisfy the block threshold satisfy one or more thresholds associated with the set of information protection schemes. In a non-limiting example, the memory device may support two information protection schemes. A first information protection scheme may use a first quantity of planes equal to the total quantity of planes associated with the control channel (e.g., 24 planes), while a second information protection scheme may use a second quantity of planes less than the total quantity of planes associated with the control channel (e.g., 18 planes).

In some cases, the block threshold may be the first threshold 215. In such cases, each plane 210 associated with the memory channel may satisfy the block threshold (e.g., each plane 210 may include an available block). Accordingly, the quantity of planes which satisfy the block threshold may satisfy a threshold associated with the first information protection scheme (e.g., all 24 planes may be used for a protected write) and a threshold associated with the second information protection scheme (e.g., a subset of 18 planes may be used for a protected write). Because the first information protection scheme may allow for better performance (e.g., a faster sequential write), the memory system may select the first information protection scheme.

Additionally or alternatively, the block threshold may be the second threshold 220. In such cases, a subset of the planes associated with the memory channel may satisfy the block threshold (e.g., 22 planes may include an available block). Accordingly, the quantity of planes which satisfy the block threshold may not satisfy the threshold associated with the first information protection scheme. However, the quantity of planes which satisfy the block threshold may not satisfy the threshold associated with the second information protection scheme. Thus, the memory system may select the second information protection scheme.

In some cases, the block threshold may be a third threshold 225. In such cases, a second subset of the planes associated with the memory channel may satisfy the block threshold (e.g., 17 planes may include an available block). Accordingly, the quantity of planes which satisfy the block threshold may not satisfy the threshold associated with the first information protection scheme or the second threshold associated with the second information protection scheme. Accordingly, the memory device may not be able to perform a protected write using either the first information protection scheme or the second information protection scheme. In some cases, the memory device may mark itself as full or otherwise unable to perform a protected write.

In some cases, as part of performing a protected write operation, the memory system may select a quantity of planes which satisfy the block threshold. The selected planes may be used for the protected write operation. In some cases, the quantity of planes that satisfy the block threshold may be greater than the quantity of planes used for the selected information protection scheme. In such cases, the memory system may select the planes using the quantity of defective blocks. For example, the memory system may select a plane with a higher quantity of defective blocks. In other examples, the memory system may select a plane with a lower quantity of defective blocks.

Dynamically selecting an information protection scheme, as described herein, may increase the yield of manufactured memory devices. For example, a memory device with a large quantity of defective blocks in a plane may have a reduced density (e.g., a reduced capacity) if the memory device uses a static information protection scheme. However, by adjusting the information protection scheme, the memory device may increase the density by allowing otherwise unused available blocks to be used in the adjusted information protection scheme. Accordingly, the described techniques may allow more memory devices to be manufactured successfully, for example by increasing the available density of memory devices with a relatively large quantity of defective blocks.

Figure 3:
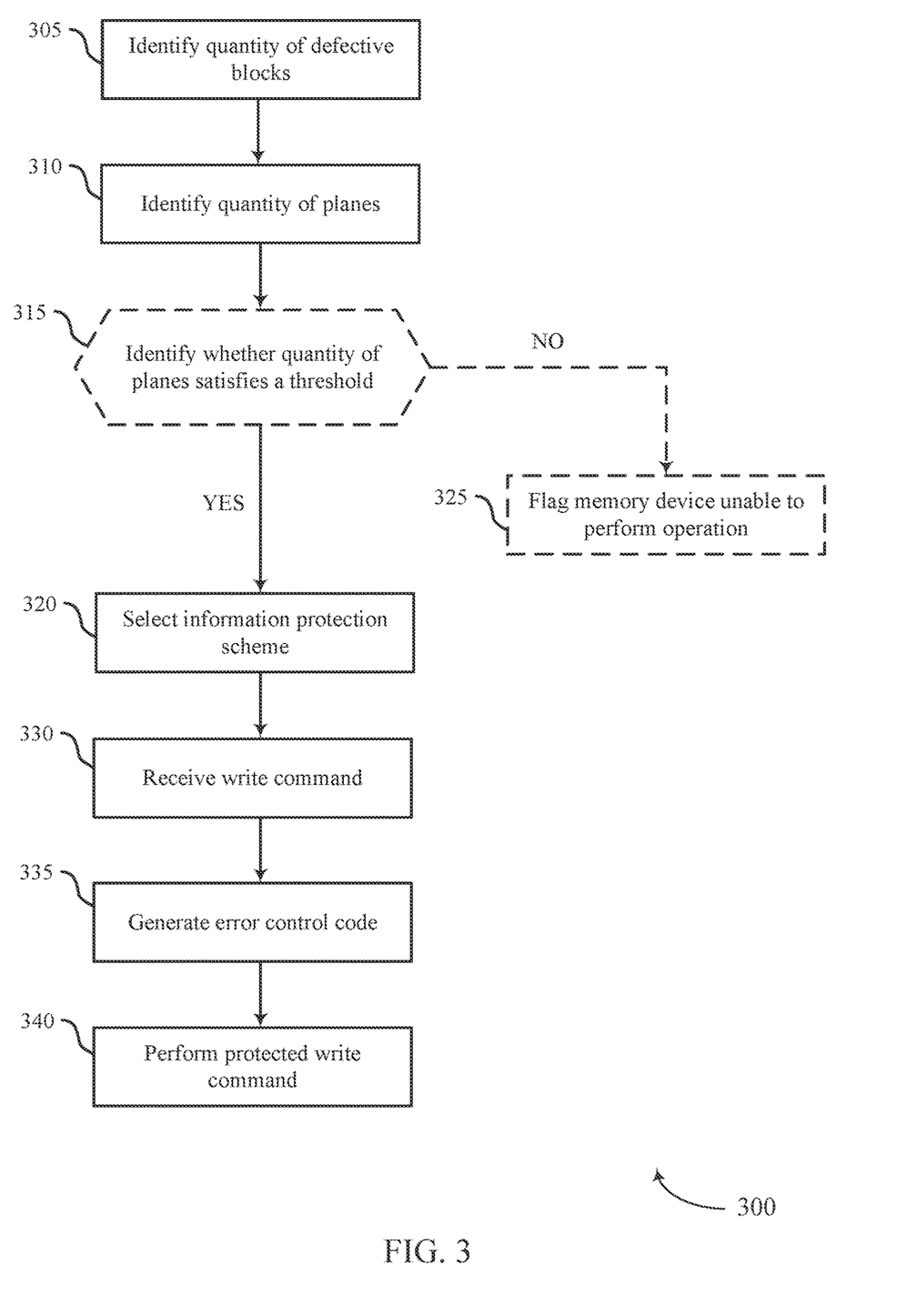
FIG. 3 illustrates an example of a process flow that supports managing information protection schemes in memory systems in accordance with examples as disclosed herein.

FIG. 3 illustrates an example of a process flow 300 that supports managing information protection schemes in memory systems in accordance with examples as disclosed herein. The process flow 300 may be implemented by a memory device or controller, which may be examples of the respective devices described with reference to FIG. 1. In the following description of process flow 300, the operations may be performed in a different order than the order shown. For example, specific operations may also be left out of process flow 300, or other operations may be added to process flow 300.

At 305, the memory device may identify a quantity of defective blocks in each plane of a plurality of planes associated with a control channel of the memory device. For example, the memory device may check each block of the memory device, or otherwise measuring the quantity of defective blocks in each plane. In some cases, the memory device may measure the quantity during a testing phase as part of manufacturing the memory device.

Additionally or alternatively, the memory device may measure the quantity of defective blocks by performing a memory management operation on the plurality of planes, such as a background operation to check the status of the memory device. In some cases, the memory device may identify a quantity of available blocks in each plane of the plurality of planes during the memory management operation. In some cases, the memory device may store an indication of the quantity of defective blocks in each plane, an indication of the quantity of available blocks in each plane, or both, for example at a register or other location within the memory device.

At 310, the memory device may identify a quantity of planes of the plurality of planes where the quantity of defective blocks of each respective plane satisfy the block threshold. For example, for each plane of the plurality of planes, the memory device may, using the quantity of defective blocks and the quantity of available blocks, determine whether the plane satisfies a block threshold. The quantity of planes may accordingly represent the quantity of planes which satisfy the block threshold.

At 315, the memory device may identify whether the quantity of planes where the quantity of defective blocks of each respective plane satisfy one or more thresholds associated with one or more information protection schemes. By way of example, a first information protection scheme of a plurality of information protection schemes may use a first quantity pages (e.g., 24 pages, a first threshold) in a block of each plane as part of performing a protected write operation. The first quantity may correspond to the total quantity of planes of a control channel of the memory device, for example as described with reference to FIG. 2. In some cases, a second information protection scheme of the plurality of information protection schemes may use a second quantity pages (e.g., 18 pages, a second threshold) in a block of each plane, and a third information protection scheme of the plurality of information protection schemes may use a third quantity pages (e.g., 12 pages, a third threshold) in a block of each plane. Accordingly, if the memory device identified at 310 that the quantity of planes which satisfy the block threshold is greater than or equal to the first quantity (e.g., if there are at least 24 planes with available blocks), the memory device may, at 320, select the first information protection scheme for performing the protected write operation.

Additionally or alternatively, the memory device may determine that quantity of planes identified at 310 may be less than the first quantity, and thus does not satisfy the first threshold. Accordingly, the memory device may identify whether the quantity of planes which satisfy the block threshold may be greater than or equal to the second quantity (e.g., if there are at least 18 planes with available blocks). If the quantity of planes which satisfy the block threshold satisfies the second threshold, the memory device may, at 320, select the second information protection scheme for performing the protected write operation.

In some cases, the memory device may determine that quantity of planes identified at 310 may be less than the first quantity and the second quantity, and thus does not satisfy the first threshold or the second threshold. In such cases, the memory device may identify whether the quantity of planes which satisfy the block threshold may be greater than or equal to the third quantity (e.g., if there are at least 12 planes with available blocks). If the quantity of planes which satisfy the block threshold satisfies the third threshold, the memory device may, at 320, select the third information protection scheme for performing the protected write operation.

In some example, the quantity of planes identified at 310 may not satisfy any of the first threshold, the second threshold, or the third threshold, or another threshold associated with each of the information protection schemes of the plurality of information protection schemes. Accordingly, the memory device may not be able to perform a protected write operation using an information protection scheme of the plurality of information protection schemes. In such examples, the memory device may, at 325 may mark itself as full or otherwise unable to perform a protected write operation.

In some cases, at 330, the memory device may receive a write command, for example from a host device. The write command may correspond to write access request or protected write operation to program data from the host device, such as user information or data. To perform or execute the write command, the memory device may, at 335, generate one or more error control codes using the user information or data. The one or more error control codes may be configured to be used in an error control procedure to detect or correct errors in the data, in some cases, the memory device may include an error control engine to generate the one or more error control codes and perform the error control procedure. In some cases, the quantity of the one or more error control codes may depend on the quantity of planes associated with the information protection scheme selected at 320.

In some cases, at 340, the memory device may perform the protected write command using the one or more error control codes generated at 335 and the information protection scheme selected at 320. For example, if the memory device selected the first information protection scheme at 320, then the memory device may program the data, the one or more error control codes generated at 335, or both to a page of a block of each plane associated with the control channel of the memory device.

Additionally or alternatively, if the memory device selected the second information protection scheme at 320, then the memory device may program the data, the one or more error control codes generated at 335, or both to a page of a block of each of a subset of the planes associated with the control channel of the memory device (e.g., to the second quantity of planes). In some cases, there may be more available planes than the quantity of planes indicated in the selected information protection scheme. In such cases, the memory device may select which planes to include in the protected write operation. For example, the memory device may select planes with a relatively higher quantity of available blocks to include in the protected write operation.

Aspects of the process flow 300 may be implemented by a controller, among other components. Additionally or alternatively, aspects of the process flow 300 may be implemented as instructions stored in memory (e.g., firmware stored in a memory coupled with the memory device). For example, the instructions, when executed by a controller (e.g., the memory system controller 115 or local controller 135 as described with reference to FIG. 1), may cause the controller to perform the operations of the process flow 300.

Figure 4:
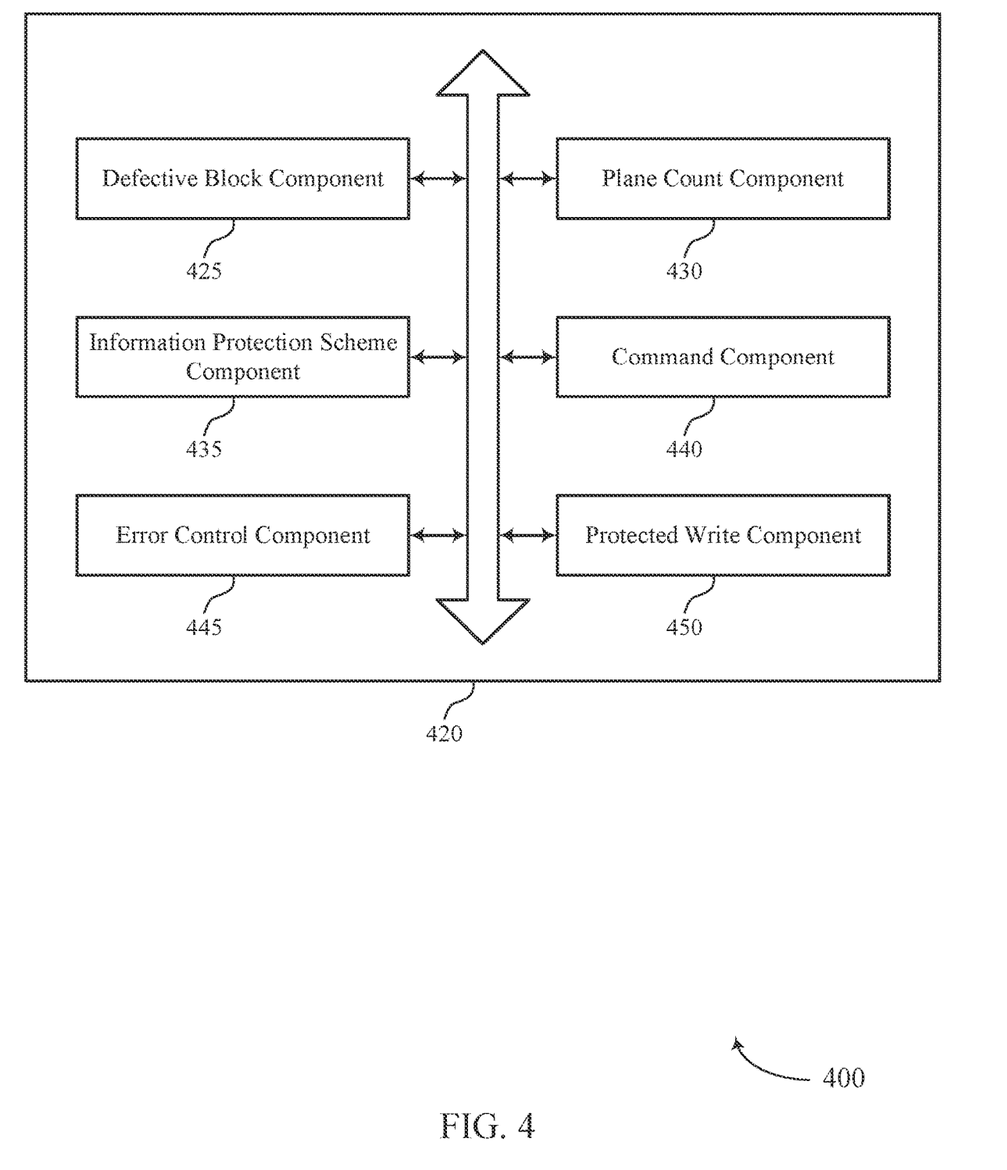
FIG. 4 shows a block diagram of a memory system that supports managing information protection schemes in memory systems in accordance with examples as disclosed herein.

FIG. 4 shows a block diagram 400 of a memory system 420 that supports managing information protection schemes in memory systems in accordance with examples as disclosed herein. The memory system 420 may be an example of aspects of a memory system as described with reference to FIGS. 1 through 3. The memory system 420, or various components thereof, may be an example of means for performing various aspects of managing information protection schemes in memory systems as described herein. For example, the memory system 420 may include a defective block component 425, a plane count component 430, an information protection scheme component 435, a command component 440, an error control component 445, a protected write component 450, or any combination thereof. Each of these components may communicate, directly or indirectly, with one another (e.g., via one or more buses).

The defective block component 425 may be configured as or otherwise support a means for identifying a quantity of defective blocks in each plane of a plurality of planes associated with a control channel of a memory device. The plane count component 430 may be configured as or otherwise support a means for identifying a quantity of planes of the plurality of planes where the quantity of defective blocks of each respective plane satisfies a threshold based at least in part on identifying the quantity of defective blocks in each plane. The information protection scheme component 435 may be configured as or otherwise support a means for selecting an information protection scheme from a plurality of information protection schemes for the plurality of planes based at least in part on the quantity of planes that satisfy the threshold.

In some examples, the defective block component 425 may be configured as or otherwise support a means for identifying whether the quantity of defective blocks of each respective plane satisfies the threshold, where identifying the quantity of planes is based at least in part on the identifying.

In some examples, the plane count component 430 may be configured as or otherwise support a means for identifying whether the quantity of planes satisfies a second threshold associated with the information protection scheme and a second information protection scheme of the plurality of information protection schemes, where selecting the information protection scheme is based at least in part on the quantity of planes failing to satisfy the second threshold.

In some examples, the plane count component 430 may be configured as or otherwise support a means for identifying whether the quantity of planes satisfies a second threshold associated with the information protection scheme and a second information protection scheme of the plurality of information protection schemes and a third threshold associated with the information protection scheme and a third information protection scheme of the plurality of information protection schemes, where selecting the information protection scheme is based at least in part on the quantity of planes satisfying the second threshold and failing to satisfy the third threshold.

In some examples, to support identifying the quantity of defective blocks, the defective block component 425 may be configured as or otherwise support a means for performing a memory management operation on the plurality of planes.

In some examples, the command component 440 may be configured as or otherwise support a means for receiving, from a host device, a write command. In some examples, the error control component 445 may be configured as or otherwise support a means for generating a quantity of error control codes for data associated with the write command based at least in part on selecting the information protection scheme. In some examples, the protected write component 450 may be configured as or otherwise support a means for performing a protected write command based at least in part on the write command and the quantity of error control codes.

In some examples, the information protection scheme indicates that a page of each plane of the plurality of planes is used for a protected write command and a second information protection scheme of the plurality of information protection schemes indicates that a page of each plane of a subset of the plurality of planes is used for a protected write command.

In some examples, the plurality of information protection schemes includes three or more information protection schemes. In some examples, the quantity of defective blocks of each respective plane satisfying the threshold is further based at least in part on a quantity of available blocks of each respective plane. In some examples, the information protection scheme includes a RAIN scheme. In some examples, the plurality of information protection schemes includes the information protection scheme that uses a first plurality of planes to generate one or more codes and a second information protection scheme that uses a second plurality of planes to generate one or more codes.

Figure 5:
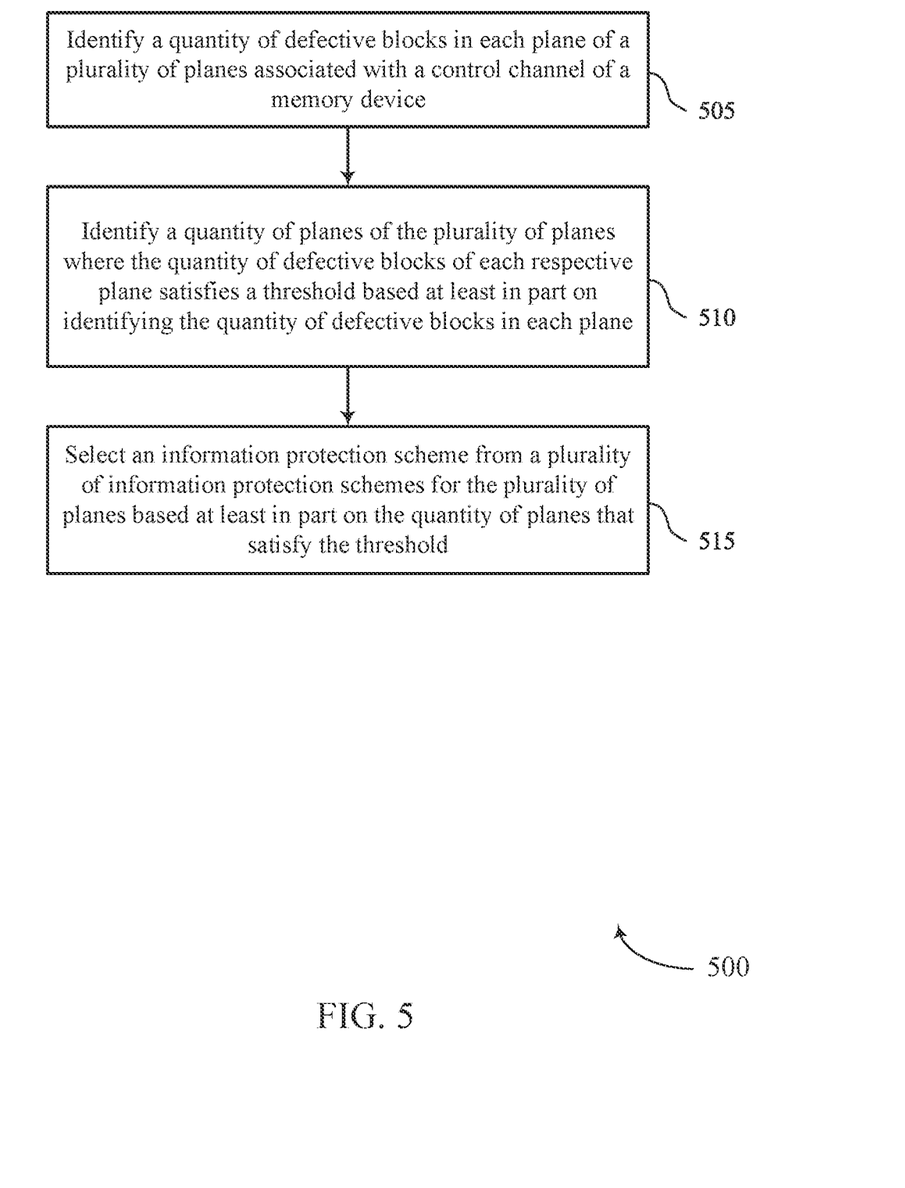
FIG. 5 shows a flowchart illustrating a method or methods that support managing information protection schemes in memory systems in accordance with examples as disclosed herein.

FIG. 5 shows a flowchart illustrating a method 500 that supports managing information protection schemes in memory systems in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include identifying a quantity of defective blocks in each plane of a plurality of planes associated with a control channel of a memory device. The operations of 505 may be performed in accordance with examples as disclosed herein. In some examples, aspects of the operations of 505 may be performed by a defective block component 425 as described with reference to FIG. 4.

At 510, the method may include identifying a quantity of planes of the plurality of planes where the quantity of defective blocks of each respective plane satisfies a threshold based at least in part on identifying the quantity of defective blocks in each plane. The operations of 510 may be performed in accordance with examples as disclosed herein. In some examples, aspects of the operations of 510 may be performed by a plane count component 430 as described with reference to FIG. 4.

At 515, the method may include selecting an information protection scheme from a plurality of information protection schemes for the plurality of planes based at least in part on the quantity of planes that satisfy the threshold. The operations of 515 may be performed in accordance with examples as disclosed herein. In some examples, aspects of the operations of 515 may be performed by an information protection scheme component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor), or any combination thereof for performing the following aspects of the present disclosure:

Aspect 1: The apparatus, including features, circuitry, logic, means, or instructions, or any combination thereof for identifying a quantity of defective blocks in each plane of a plurality of planes associated with a control channel of a memory device; identifying a quantity of planes of the plurality of planes where the quantity of defective blocks of each respective plane satisfies a threshold based at least in part on identifying the quantity of defective blocks in each plane; and selecting an information protection scheme from a plurality of information protection schemes for the plurality of planes based at least in part on the quantity of planes that satisfy the threshold.

Aspect 2: The apparatus of aspect 1, further including operations, features, circuitry, logic, means, or instructions, or any combination thereof for identifying whether the quantity of defective blocks of each respective plane satisfies the threshold, where identifying the quantity of planes is based at least in part on the identifying.

Aspect 3: The apparatus of any of aspects 1 through 2, further including operations, features, circuitry, logic, means, or instructions, or any combination thereof for identifying whether the quantity of planes satisfies a second threshold associated with the information protection scheme and a second information protection scheme of the plurality of information protection schemes, where selecting the information protection scheme is based at least in part on the quantity of planes failing to satisfy the second threshold.

Aspect 4: The apparatus of any of aspects 1 through 3, further including operations, features, circuitry, logic, means, or instructions, or any combination thereof for identifying whether the quantity of planes satisfies a second threshold associated with the information protection scheme and a second information protection scheme of the plurality of information protection schemes and a third threshold associated with the information protection scheme and a third information protection scheme of the plurality of information protection schemes, where selecting the information protection scheme is based at least in part on the quantity of planes satisfying the second threshold and failing to satisfy the third threshold.

Aspect 5: The apparatus of any of aspects 1 through 4 where identifying the quantity of defective blocks, further includes operations, features, circuitry, logic, means, or instructions, or any combination thereof for performing a memory management operation on the plurality of planes.

Aspect 6: The apparatus of any of aspects 1 through 5, further including operations, features, circuitry, logic, means, or instructions, or any combination thereof for receiving, from a host device, a write command; generating a quantity of error control codes for data associated with the write command based at least in part on selecting the information protection scheme; and performing a protected write command based at least in part on the write command and the quantity of error control codes.

Aspect 7: The apparatus of any of aspects 1 through 6, further including operations, features, circuitry, logic, means, or instructions, or any combination thereof for the information protection scheme indicates that a page of each plane of the plurality of planes is used for a protected write command and a second information protection scheme of the plurality of information protection schemes indicates that a page of each plane of a subset of the plurality of planes is used for a protected write command.

Aspect 8: The apparatus of any of aspects 1 through 7, further including operations, features, circuitry, logic, means, or instructions, or any combination thereof for the plurality of information protection schemes includes three or more information protection schemes.

Aspect 9: The apparatus of any of aspects 1 through 8, further including operations, features, circuitry, logic, means, or instructions, or any combination thereof for the quantity of defective blocks of each respective plane satisfying the threshold is further based at least in part on a quantity of available blocks of each respective plane.

Aspect 10: The apparatus of any of aspects 1 through 9, further including operations, features, circuitry, logic, means, or instructions, or any combination thereof for the information protection scheme includes a RAIN scheme.

Aspect 11: The apparatus of any of aspects 1 through 10, further including operations, features, circuitry, logic, means, or instructions, or any combination thereof for the plurality of information protection schemes includes the information protection scheme that uses a first plurality of planes to generate one or more codes and a second information protection scheme that uses a second plurality of planes to generate one or more codes.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, air ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
identifying a respective quantity of defective blocks in each plane of a plurality of planes associated with a control channel of a memory device;
determining, for each plane of the plurality of planes, whether the respective quantity of defective blocks of each plane of the plurality of planes satisfies a threshold;
identifying a subset of planes of the plurality of planes wherein the respective quantity of defective blocks of each plane of the subset of planes satisfies the threshold; and
selecting an information protection scheme from a plurality of information protection schemes for the plurality of planes based at least in part on a quantity of planes in the subset of planes.

2. The method of claim 1, further comprising:
identifying whether the quantity of defective blocks of each respective plane satisfies the threshold, wherein identifying the quantity of planes is based at least in part on the identifying of the quantity of defective blocks in each plane.

3. The method of claim 1, further comprising:
identifying whether the quantity of planes satisfies a second threshold associated with the information protection scheme and a second information protection scheme of the plurality of information protection schemes, wherein selecting the information protection scheme is based at least in part on the quantity of planes failing to satisfy the second threshold.

4. The method of claim 1, further comprising:
identifying whether the quantity of planes satisfies a second threshold associated with the information protection scheme and a second information protection scheme of the plurality of information protection schemes and a third threshold associated with the information protection scheme and a third information protection scheme of the plurality of information protection schemes, wherein selecting the information protection scheme is based at least in part on the quantity of planes satisfying the second threshold and failing to satisfy the third threshold.

5. The method of claim 1, wherein identifying the quantity of defective blocks further comprises:
performing a memory management operation on the plurality of planes.

6. The method of claim 1, further comprising:
receiving, from a host device, a write command;
generating a quantity of error control codes for data associated with the write command based at least in part on selecting the information protection scheme; and
performing a protected write command based at least in part on the write command and the quantity of error control codes.

7. The method of claim 1, wherein:
the information protection scheme indicates that a page of each plane of the plurality of planes is used for a protected write command; and
a second information protection scheme of the plurality of information protection schemes indicates that a page of each plane of a second subset of the plurality of planes is used for a protected write command.

8. The method of claim 1, wherein the plurality of information protection schemes comprises three or more information protection schemes.

9. The method of claim 1, wherein the quantity of defective blocks of each respective plane satisfying the threshold is further based at least in part on a quantity of available blocks of each respective plane.

10. The method of claim 1, wherein the information protection scheme comprises a redundant array of independent nodes (RAIN) scheme.

11. The method of claim 1, wherein the plurality of information protection schemes comprises:
the information protection scheme that uses a first plurality of planes to generate one or more codes; and
a second information protection scheme that uses a second plurality of planes to generate one or more codes.

12. An apparatus, comprising:
a controller associated with a memory device, wherein the controller is configured to cause the apparatus to:
identify a respective quantity of defective blocks in each plane of a plurality of planes associated with a control channel of a memory device;
determine, for each plane of the plurality of planes, whether the respective quantity of defective blocks of each plane of the plurality of planes satisfies a threshold;
identify a subset of planes of the plurality of planes wherein the respective quantity of defective blocks of each plane of the subset of planes satisfies the threshold; and
select an information protection scheme from a plurality of information protection schemes for the plurality of planes based at least in part on a quantity of planes in the subset of planes.

13. The apparatus of claim 12, wherein the controller is further configured to cause the apparatus to:
identify whether the quantity of defective blocks of each respective plane satisfies the threshold, wherein identifying the quantity of planes is based at least in part on the identifying of the quantity of defective blocks in each plane.

14. The apparatus of claim 12, wherein the controller is further configured to cause the apparatus to:
identify whether the quantity of planes satisfies a second threshold associated with the information protection scheme and a second information protection scheme of the plurality of information protection schemes, wherein selecting the information protection scheme is based at least in part on the quantity of planes failing to satisfy the second threshold.

15. The apparatus of claim 12, wherein the controller is further configured to cause the apparatus to:
identify whether the quantity of planes satisfies a second threshold associated with the information protection scheme and a second information protection scheme of the plurality of information protection schemes and a third threshold associated with the information protection scheme and a third information protection scheme of the plurality of information protection schemes, wherein selecting the information protection scheme is based at least in part on the quantity of planes satisfying the second threshold and failing to satisfy the third threshold.

16. The apparatus of claim 12, wherein identifying the quantity of defective blocks is further configured to cause the apparatus to:
perform a memory management operation on the plurality of planes.

17. The apparatus of claim 12, wherein the controller is further configured to cause the apparatus to:
   receive, from a host device, a write command;
   generate a quantity of error control codes for data associated with the write command based at least in part on selecting the information protection scheme; and
   perform a protected write command based at least in part on the write command and the quantity of error control codes.

18. The apparatus of claim 12, wherein:
   the information protection scheme indicates that a page of each plane of the plurality of planes is used for a protected write command; and
   a second information protection scheme of the plurality of information protection schemes indicates that a page of each plane of a second subset of the plurality of planes is used for a protected write command.

19. The apparatus of claim 12, wherein:
   the plurality of information protection schemes comprises three or more information protection schemes.

20. The apparatus of claim 12, wherein the quantity of defective blocks of each respective plane satisfying the threshold is further based at least in part on a quantity of available blocks of each respective plane.

21. The apparatus of claim 12, wherein the information protection scheme comprises a redundant array of independent nodes (RAIN) scheme.

22. The apparatus of claim 12, wherein the plurality of information protection schemes comprises:
   the information protection scheme that uses a first plurality of planes to generate one or more codes; and
   a second information protection scheme that uses a second plurality of planes to generate one or more codes.

23. A non-transitory computer-readable medium storing code, the code comprising instructions executable by a processor to:
   identify a respective quantity of defective blocks in each plane of a plurality of planes associated with a control channel of a memory device;
   determine, for each plane of the plurality of planes, whether the respective quantity of defective blocks of each plane of the plurality of planes satisfies a threshold;
   identify a subset of planes of the plurality of planes wherein the respective quantity of defective blocks of each plane of the subset of planes satisfies the threshold; and
   select an information protection scheme from a plurality of information protection schemes for the plurality of planes based at least in part on a quantity of planes in the subset of planes.

24. The non-transitory computer-readable medium of claim 23, wherein the instructions are further executable by the processor to:
   identify whether the quantity of defective blocks of each respective plane satisfies the threshold, wherein identifying the quantity of planes is based at least in part on the identifying of the quantity of defective blocks in each plane.

25. The non-transitory computer-readable medium of claim 23, wherein the instructions are further executable by the processor to:
   identify whether the quantity of planes satisfies a second threshold associated with the information protection scheme and a second information protection scheme of the plurality of information protection schemes, wherein selecting the information protection scheme is based at least in part on the quantity of planes failing to satisfy the second threshold.

\* \* \* \* \*